Sept. 9, 1947.  F. W. CRAWFORD  2,427,261
METHOD FOR ANALYZING GAS
Filed Sept. 30, 1939   3 Sheets-Sheet 3

INVENTOR
FRANCIS W. CRAWFORD
BY
ATTORNEYS

Patented Sept. 9, 1947

2,427,261

UNITED STATES PATENT OFFICE 2,427,261

METHOD FOR ANALYZING GAS

Francis W. Crawford, Bartlesville, Okla., assignor to Phillips Petroleum Company, a corporation of Delaware Application September 30, 1939, Serial No. 297,379

2 Claims. (Cl. 23—232)

This invention relates to a method of and apparatus for the analysis of gaseous mixtures containing hydrocarbon vapors.

The examination of soil samples and of ground waters for traces of minerals has long been used by prospectors as a means of gaining information as to the probable presence of profitable ore deposits in advance of drilling or mining operations. Thus, the mineral content of ground water held in either a dissolved or a suspended state, may furnish valuable clues as to the nature of the subsurface which the water traverses. The first commercial oil field to be discovered in the United States revealed its presence by oil seepage at the surface, and since that time, the evidence of visible oil or gas seeps has been utilized whenever available in choosing new locations to be tested by the drill.

Recently there has been considerable interest in the possibility of locating petroleum beds by determining the hydrocarbon content of soil samples taken at or near the surface of the earth. Laboratory experiments have shown a good physical basis for the hypothesis that over a long period of time the earth strata overlying petroleum bearing formations might well acquire small percentages of hydrocarbons due to adsorption of gases escaping from the petroleum deposit. Soil gases to be analyzed for hydrocarbons are obtained either by withdrawal from the ground directly or by extraction from a soil sample by the application of heat and vacuum. These soil gases contain large amounts of air and inert gases with comparatively small percentages of hydrocarbons. Since methane is of common occurrence in soil gases due to the decomposition of organic matter in the soil, it is preferable to use ethane as a basis for prospecting for petroleum. Various methods and apparatus have previously been employed for analysis of gaseous mixtures. In applying these to the analysis of soil gases they were found to be time consuming, unwieldy, and inaccurate.

In broad outline, the method described herein consists of passing the gases to be analyzed through a partially evacuated glass train and trapping the hydrocarbons, or their products of combustion, in certain parts of the system where they can be measured quantitatively. Carbon dioxide and water vapor are removed from the gas by potassium hydroxide and phosphorus pentoxide. Hydrocarbons heavier than methane are trapped in a condenser immersed in liquid nitrogen. The methane and air mixture passing through the first condenser is burned in a combustion cell and the water of combustion removed by phosphorus pentoxide. The carbon dioxide formed by combustion is condensed in a second condenser immersed in liquid nitrogen. When the requisite sample has passed through the apparatus, the condensers are pumped to a high vacuum. The condensers are then isolated, warmed up to room temperature and the pressures of the trapped components measured by means of sensitive pressure gauge. These two pressures indicate the volume of the methane and the volume of the hydrocarbons heavier than methane present in the sample. Ethane is distilled from the heavier hydrocarbons by immersing the first condenser in liquid oxygen and pumping off the ethane. The volume of the heavier hydrocarbons remaining in the condenser is determined by isolating the condenser, allowing it to warm up to room temperature, and observing the pressure exerted by the gases. The volume of the ethane removed is then determined by subtraction. The use of solid absorbers in the gas washing train for the removal of carbon dioxide and water vapor permits placing a high vacuum on the apparatus.

An important object of the present invention is to provide a method and apparatus for the quantitative determination of combustible constituents in a gaseous mixture.

A further object of the present invention is to provide a method for the quantitative determination of methane and ethane in a gaseous mixture.

A still further object is to provide an improved gas testing method and apparatus adapted to analysis of hydrocarbons in soil gases.

Other objects and advantages will be apparent from the specification and accompanying drawings.

Figure 1:
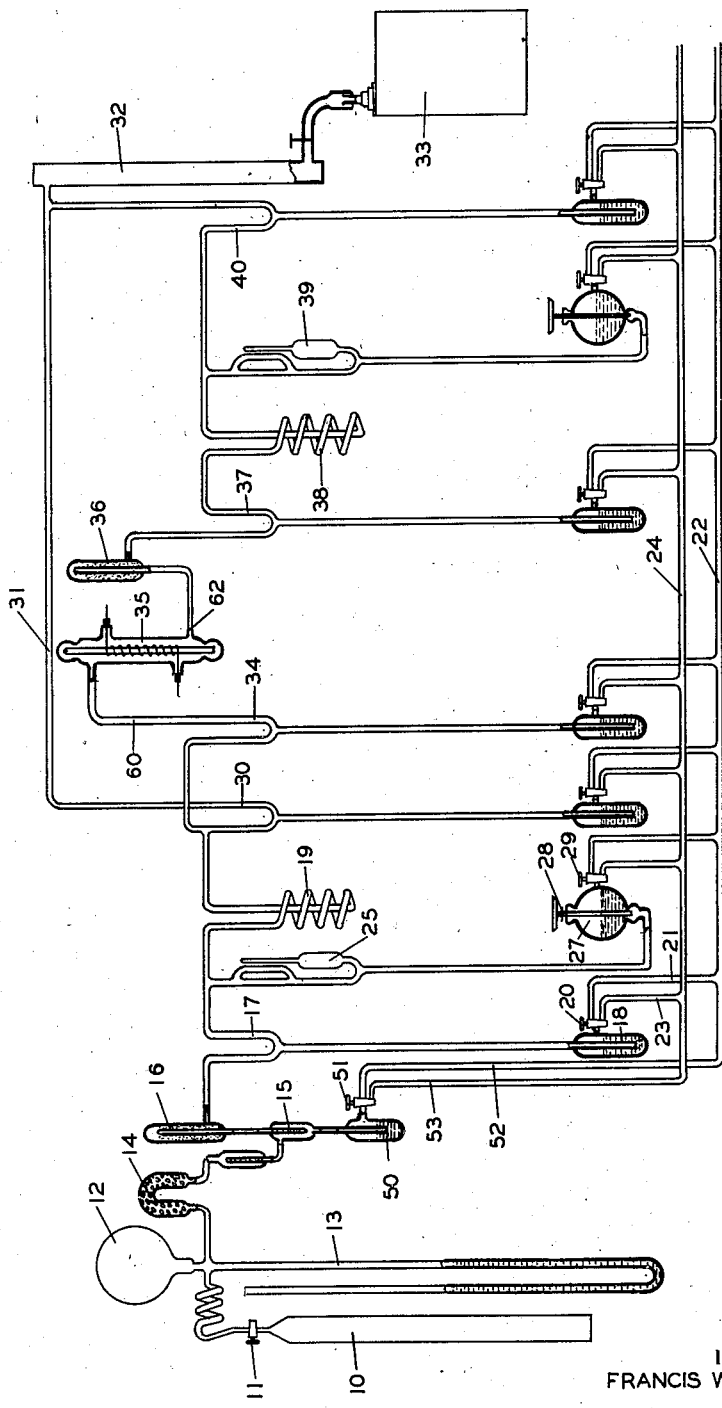
Figure 1 is a diagrammatic view of a preferred form of apparatus for carrying out the invention.

The system shown in the drawings illustrates a preferred form of apparatus for carrying out the present invention wherein parts are made of glass wherever possible in order to avoid contamination of the gas under investigation. Gases to be analyzed are supplied to the system from a sample bottle 10 which is provided with a stopcock 11. A container of known volume 12 and a manometer 13 furnish means for determining the volume of gas passed through the apparatus by a simple application of the gas laws. Gases withdrawn from container 12 are passed through a U-tube 14 filled with potassium hydroxide pellets to remove carbon dioxide and water vapor. An adjustable leak valve 15, shown in detail in Figure 2, controls flow of the gas through the apparatus. Any water vapor remaining in the gases is removed in drying tube 16 containing phosphorus pentoxide. A mercury cut-off valve 17 in the form of a Y with its lower end submerged in mercury contained in reservoir 18 permits isolation of drying tube 16 from the remainder of the system. A 3-way stop-cock 20 provides communication between reservoir 18 and tube 21 connected to a pressure manifold 22 or between the reservoir and tube 23 connected to a vacuum manifold 24 for controlling mercury valve 17. A condenser 19 permits trapping the more readily condensible components. Adjacent to condenser 19 is a McLeod type gauge 25 for indicating the pressure in the condenser. Mercury is supplied to gauge 25 from its reservoir 27 having a needle valve 28 for accurately controlling admission of mercury to the gauge and a 3-way stop-cock 29 providing communication between the reservoir and vacuum manifold 24 or pressure manifold 22. Gases from condenser 19 may be withdrawn through mercury cut-off valve 30 and tube 31 to vacuum pumps 32 and 33 for which I prefer to use a mercury diffusion pump 32 and mechanical vacuum pump 33 connected in series. Mercury valve 34 controls admission of gases to a combustion cell 35, shown in detail in Figure 3, from which they pass through a drying tube 36, filled with phosphorus pentoxide for the removal of water, and through mercury valve 37 to condenser 38. A McLeod type gauge 39, similar to gauge 25 indicates the pressure in condenser 38. Gases leaving condenser 38 are exhausted from the system through valve 40 and vacuum pumps 32 and 33.

Figure 2:
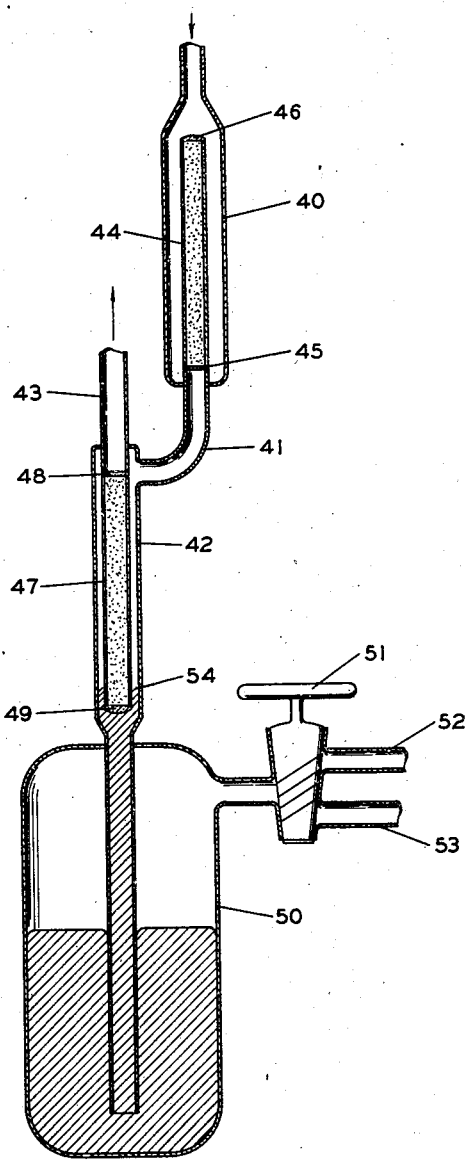
Figure 2 is a view in vertical cross-section of a mercury adjustable leak valve forming a part of the apparatus.

Figure 2 shows details of the adjustable leak valve 15. Gas enters bulb 40, passes through tube 41 to bulb 42 and is withdrawn through tube 43. Within bulb 40 is a tubular Stupakoff ceramic insulator 44 sealed to tube 41 by a fused seal 45 at one end and closed at its opposite end by glass bead 46. A similar ceramic insulator 47 is fusibly connected to tube 43 by a fused seal 48 and is sealed by a glass bead 49. Bulb 42 is extended into mercury reservoir 50. A 3-way stop-cock 51 provides communication of reservoir 50 with compressed air manifold 22 through tube 52 or with vacuum manifold 24 through tube 53. By manipulation of stop-cock 51, the height of the mercury column 54, and hence the exposed area of porous tube 47, may be controlled. This adjustable leak valve is a means for accurately controlling the flow of gas through the analyzing train.

Figure 3:
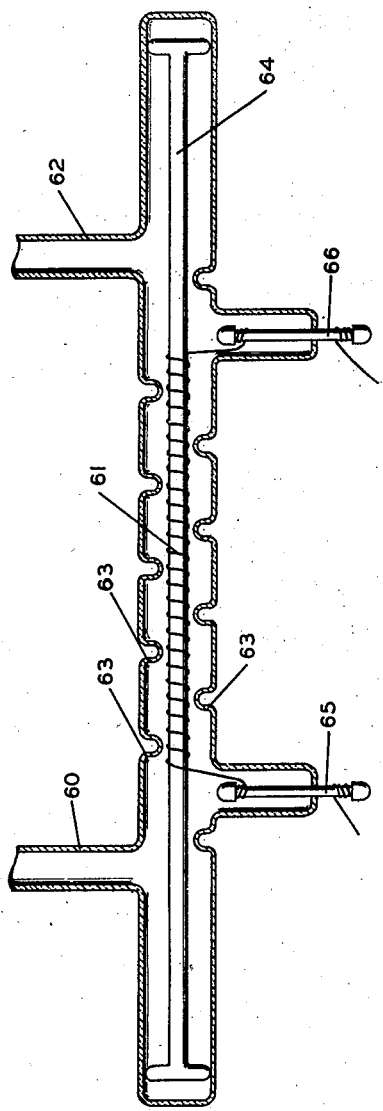
Figure 3 is a view in vertical cross-section of a combustion cell forming a part of the apparatus.

Details of combustion cell 35 are shown in Figure 3. Gas enters the combustion cell through tube 60, flows over filament 61 on which combustion takes place, and is withdrawn through tube 62. A series of baffles 63 assures contacting of the gas with the heated filament as the gas flows through the cell. Filament 61 is supported by a quartz rod 64 and its terminals 65 and 66 are connected with a source of electric current for supplying power to the filament. It was found that by arranging the combustion tube in a vertical position, the combustion was facilitated. This is no doubt due to a greater amount of turbulence being present. The hot gas contiguous with the incandescent filament would tend to rise thereupon opposing the down flowing current of fresh gas and causing greater turbulence.

In operation, gas to be analyzed together with a large excess of free oxygen-containing gas, such as air, is introduced into sample bottle 10. The gaseous material in bottle 10 is substantially free of non-hydrocarbon combustible material. Stopcock 11 and mercury valve 30 are closed while valves 15, 17, 34, 37 and 40 are all open and a high vacuum of about $10^{-4}$ mm. of mercury is pumped on the system by pumps 32 and 33 to remove any gases present in the apparatus. Vacuum pumps are kept in continuous operation maintaining a pressure not greater than 20 millimeters of mercury absolute throughout the run to avoid possible difficulty due to oxygen accumulating in the condensers. Adjustable leak valve 15 is closed by admission of mercury to the valve from its reservoir. Stop-cock 11 is opened for a sufficient length of time to permit the gas and air mixture contained in bottle 10 to fill container 12 and is then closed again. Condensers 19 and 38 are immersed in liquid nitrogen baths (not shown). Current from a suitable source is applied to the filament of combustoin cell 35 to burn any hydrocarbon gases passing through the cell. The adjustable leak valve 15 permits regulation of the run pressure and the rate at which the sample is passed through the apparatus. When the leak valve 15 is opened, gas flows slowly through the potassium hydroxide pellets contained in tube 14 and the phosphorus pentoxide contained in tube 16 effecting removal of carbon dioxide and water. In condenser 19, cooled by liquid nitrogen, all of the hydrocarbons heavier than methane condense or freeze and are retained by the condenser.

The remaining gases, including methane, flow into the combustion cell 35 where the methane is burned in a large excess of air to carbon dioxide and water vapor. The water vapor is removed by phosphorus pentoxide contained on glass beads in tube 36 while the carbon dioxide is condensed and retained in condenser 38. When the run is completed, mercury valve 17 is closed by allowing mercury from its reservoir 18 to rise past the Y shown in the figure. Since the volume of flask 12 is fixed, the volume of gas sample passed through the apparatus is readily determined by noting the change in pressure within the flask as indicated by manometer 13. At that time valves 11, 17, and 30 are closed and 15, 34, 37 and 40 are open. Mercury valve 30 is opened while the pumps continue to operate until the pressure within the apparatus has been reduced to less than $10^{-4}$ mm. of mercury. Valves 34 and 37 can be closed to save time upon approaching $10^{-4}$ mm. of mercury pressure as the porous material in tube 36 may otherwise delay obtaining such a relatively high vacuum. Mercury valves 30, 34, 37, and 40 are then closed and valve 17 remains closed, thereby cutting off the two condensers and their vacuum gauges from the rest of the system. Liquid nitrogen is removed from the condensers and the apparatus allowed to warm up to room temperature expanding the trapped gases into the corresponding free volumes which have been previously calibrated. The pressures of the confined gases are readily measured, that between valves 17 and 30 by gauge 25, and that between valves 37 and 40 by gauge 39 and the relative volumes of the gases determined by a simple application of the gas laws. This gives the volume of the hydrocarbon gases heavier than methane present in the sample tested as well as the volume of the methane. The latter follows from the combustion reaction:

$$CH_4 + 2O_2 \rightarrow CO_2 + 2H_2O$$

which shows that the combustion of one molecule of methane results in the formation of one molecule of carbon dioxide so that the volume of the carbon dioxide is therefore equal to the volume of methane present in the gas sample.

Information on methane content and hydrocarbons heavier than methane in gas samples extracted from the soil is in itself valuable and useful for exploration purposes. However, since methane may arise from sources other than petroleum, it is advantageous to obtain data on a hydrocarbon not open to this objection; for example, ethane. The ethane content of a soil gas sample is determined by making use of the fact that while this gas may be trapped together with the heavier hydrocarbons at liquid nitrogen temperature, it distills off rather rapidly when the temperature is raised to that of liquid oxygen. Condenser 19 is immersed in liquid oxygen and after allowing time for condensation to take place, mercury valve 30 is opened and condenser 19 is pumped for a given length of time, depending on how complete a cleanup of ethane is desired. At this time valves 17, 34, 37 and 40 are closed. It has been found experimentally that over 90% of the ethane will distill off in five minutes and practically 100% will distill off in ten minutes. As stated in the second paragraph above, fourth sentence, a pressure not greater than 20 millimeters of mercury absolute is maintained throughout the run. After the pumping operation is completed, valve 30 is closed and the pressure measured as before. The difference in volumes will be equivalent to the volume of ethane distilled off. If an additional identification check is desired, the ethane can be burned as it is distilled off by a method similar to that described for methane and the resultant carbon dioxide measured.

Finally, the average number of carbon atoms per molecule of the hydrocarbons remaining in condenser 19 after the ethane has been distilled off may be determined by burning the residue and measuring the resultant carbon dioxide collected in condenser 38. To do this, both condensers are immersed in liquid nitrogen. Hydrocarbon-free air from a supplementary source is started through the apparatus. The liquid nitrogen bath is then removed from condenser 19, allowing the hydrocarbons to warm up and mix with the air stream. As they do so they are carried on to the combustion unit where they are burned, the resulting carbon dioxide being collected in condenser 38. The ratio of the volume of carbon dioxide collected to the volume of the heavy hydrocarbon gases before combustion gives the average number of carbon atoms per molecule of the gas.

It will be apparent that while methane, ethane, propane, etc., have been discussed specifically, there may be instances where the hydrocarbons concerned are other than members of the paraffin series. In the claims the symbols $C_2$ and $C_3$ refer to hydrocarbons having two or three carbon atoms to the molecule respectively.

I claim:

1. In a process for determining the content of methane in a gaseous mixture free from carbon dioxide and water but including free oxygen-containing gas and a relatively small amount of hydrocarbons including methane and ethane, the steps comprising passing said gaseous mixture at a subatmospheric pressure not greater than 20 millimeters of mercury absolute through a first cooling unit that is maintained at a sufficiently low temperature to condense and retain $C_2$ and heavier hydrocarbons and high enough to pass methane and free oxygen-containing gas in a gaseous state, transmitting the methane and free oxygen-containing gas not condensed in the preceding step through a combustion zone wherein the same is burned to oxidize the methane and form a mixture including carbon dioxide and water vapor, dehydrating the mixture by passing it through a body of absorption material for water vapor, passing the dried mixture through a second cooling and condensing unit that is cooled sufficiently to condense the carbon dioxide but not the other constituents of the mixture, withdrawing and discarding from the system the said other constituents whereby the carbon dioxide alone remains in the cooling and condensing unit, raising the temperature of the unit to vaporize the carbon dioxide, and making a direct determination of the carbon dioxide gas.

2. In a process for determining the content of hydrocarbons in a gaseous mixture free from carbon dioxide and water but including free oxygen-containing gas and a relatively small amount of hydrocarbons including methane and ethane, the steps comprising passing said gaseous mixture at a subatmospheric pressure not greater than 20 millimeters of mercury absolute through a first cooling unit that is maintained at a sufficiently low temperature to condense and retain $C_2$ and heavier hydrocarbons and high enough to pass methane and free oxygen-containing gas in a gaseous state, transmitting the methane and free oxygen-containing gas not condensed in the preceding step through a combustion zone wherein the same is burned to oxidize the methane and form a mixture including carbon dioxide and water vapor, dehydrating the mixture by passing it through a body of absorption material for water vapor, passing the dried mixture through a second cooling and condensing unit that is cooled sufficiently to condense the carbon dioxide but not the other constituents of the mixture, withdrawing and discarding from the system the said other constituents whereby the carbon dioxide alone remains in the cooling and condensing unit, raising the temperature of the unit to vaporize the carbon dioxide, and making a direct determination of the carbon dioxide gas, raising the temperature of the first cooling unit sufficiently to allow $C_2$ hydrocarbons to evaporate while retaining $C_3$ and heavier hydrocarbons, determining the amount of $C_2$ hydrocarbons so released and subsequently determining the amount of residual hydrocarbons.

FRANCIS W. CRAWFORD.

REFERENCES CITED

The following references are of record in the file of this patent:

UNITED STATES PATENTS

| Number | Name | Date |
| --- | --- | --- |
| 1,474,097 | Krogh et al. | Nov. 13, 1923 |
| 1,515,237 | Yensen | Nov. 11, 1924 |
| 2,212,681 | Dunn | Aug. 27, 1940 |
| 2,287,101 | Horvitz | June 23, 1942 |

OTHER REFERENCES

Christiansen et al., Journal Industrial & Engineering Chemistry, Analytical Ed., vol. 9, No. 8, Aug. 15, 1937. Pages 400 and 401.

Burrell et al., Bur. of Mines Technical Paper No. 104, 1915, pp. 9–17.

Mitchell, Recent Advances in Analytical Chemistry, vol. I, 1930, pp. 363–366, 379, 388–392, 398–400.

Ward, Journal Industrial & Engineering Chemistry, Analytical Ed., vol. 10, 1938, pp. 169–171.